Aug. 16, 1938.  F. A. VOILES  2,127,016
INTERNAL COMBUSTION ENGINE
Filed April 21, 1937  6 Sheets-Sheet 1

Inventor:
Frank A. Voiles.

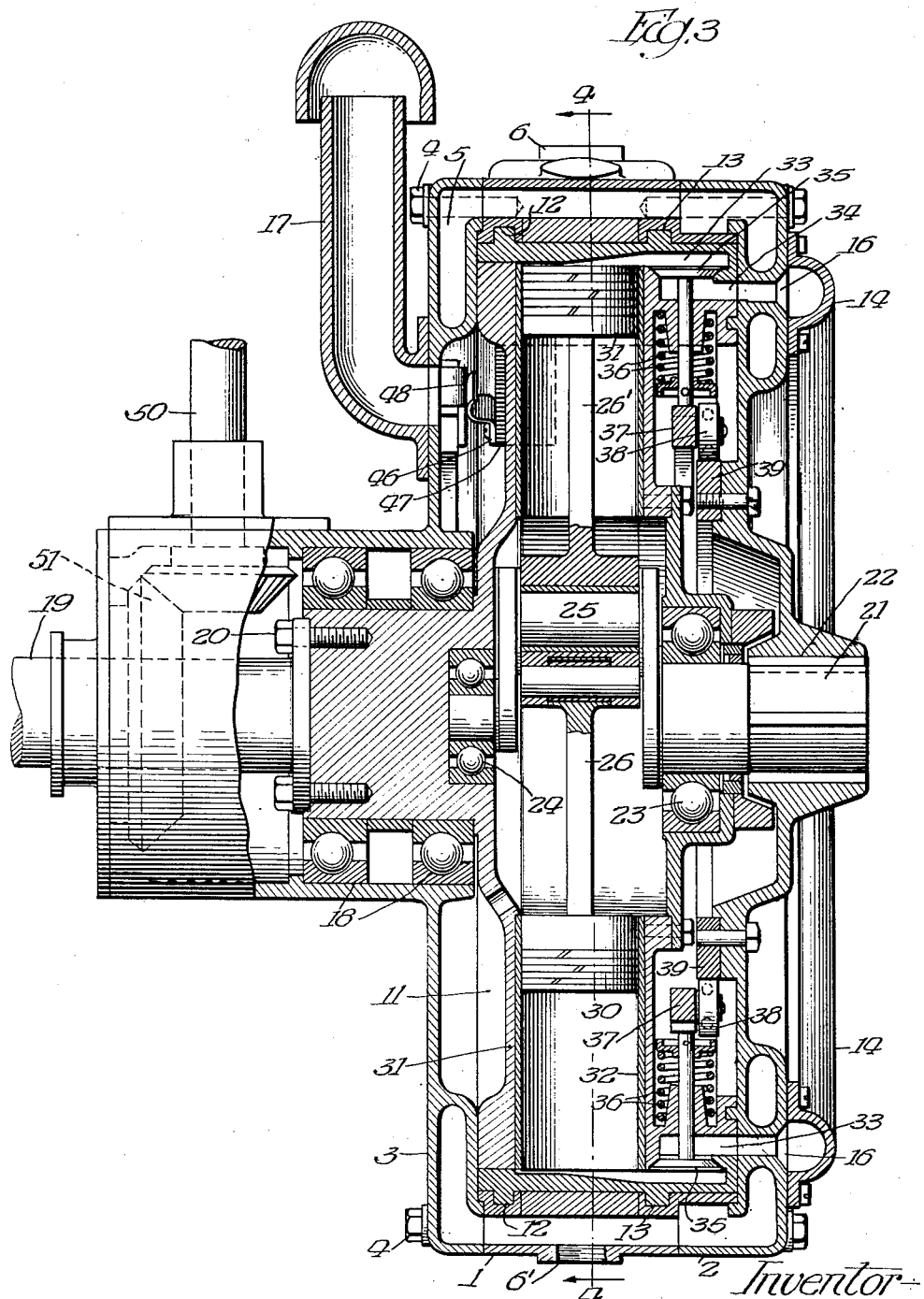

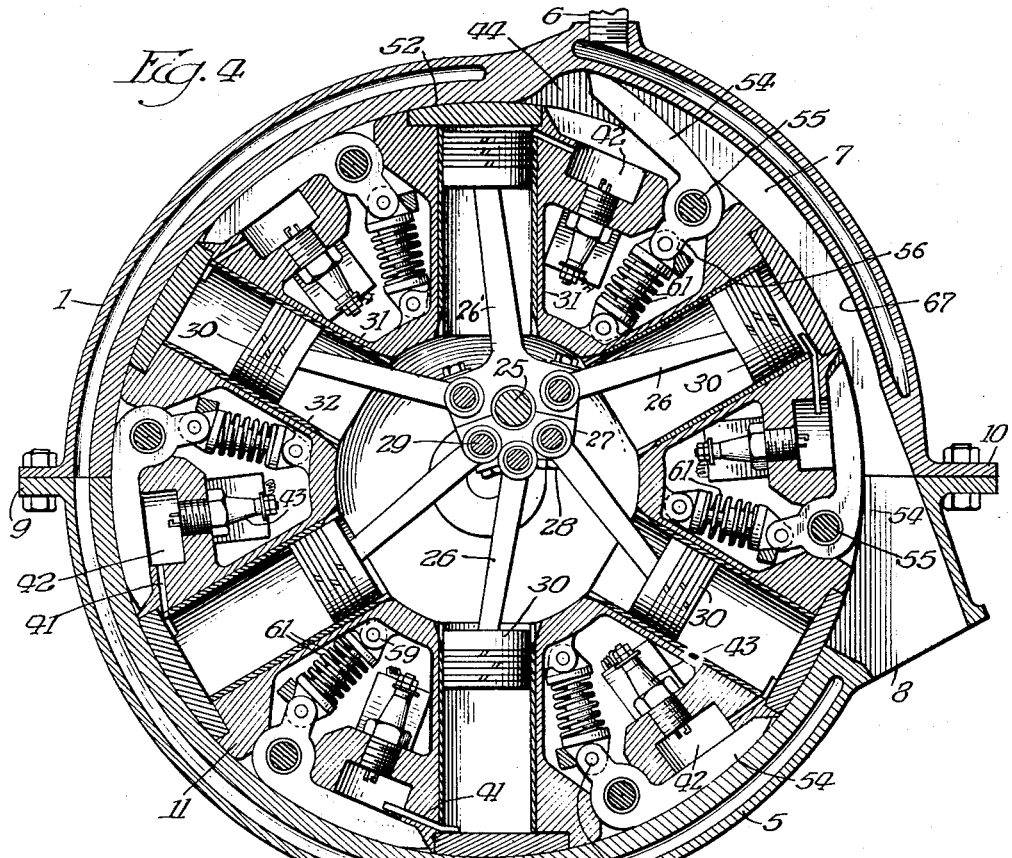
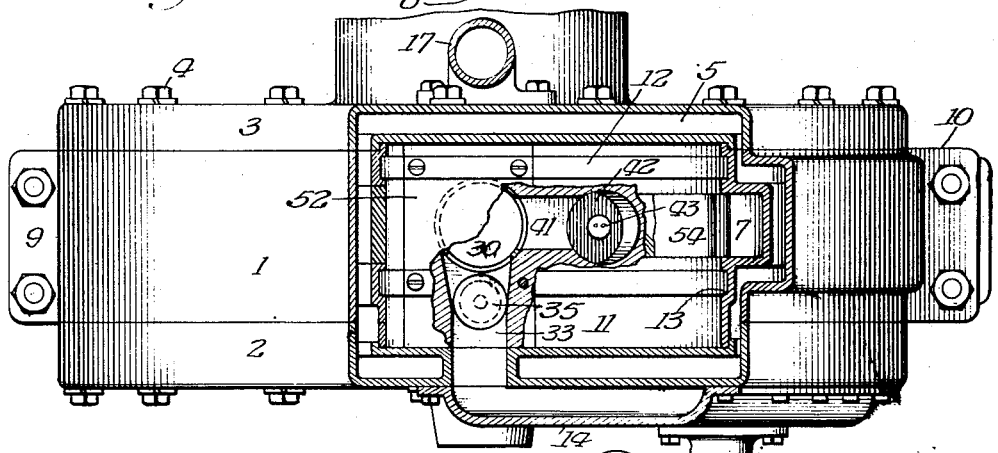

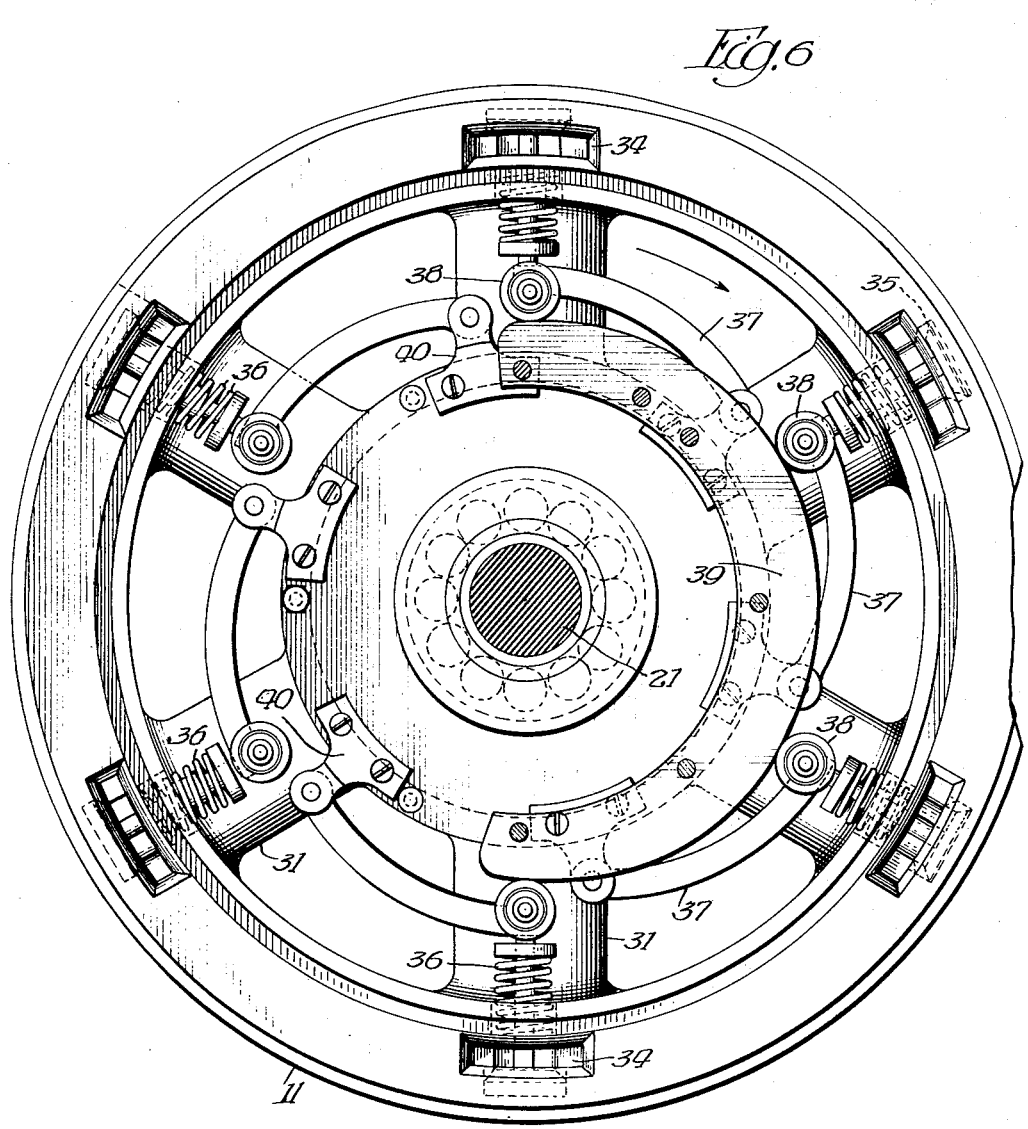

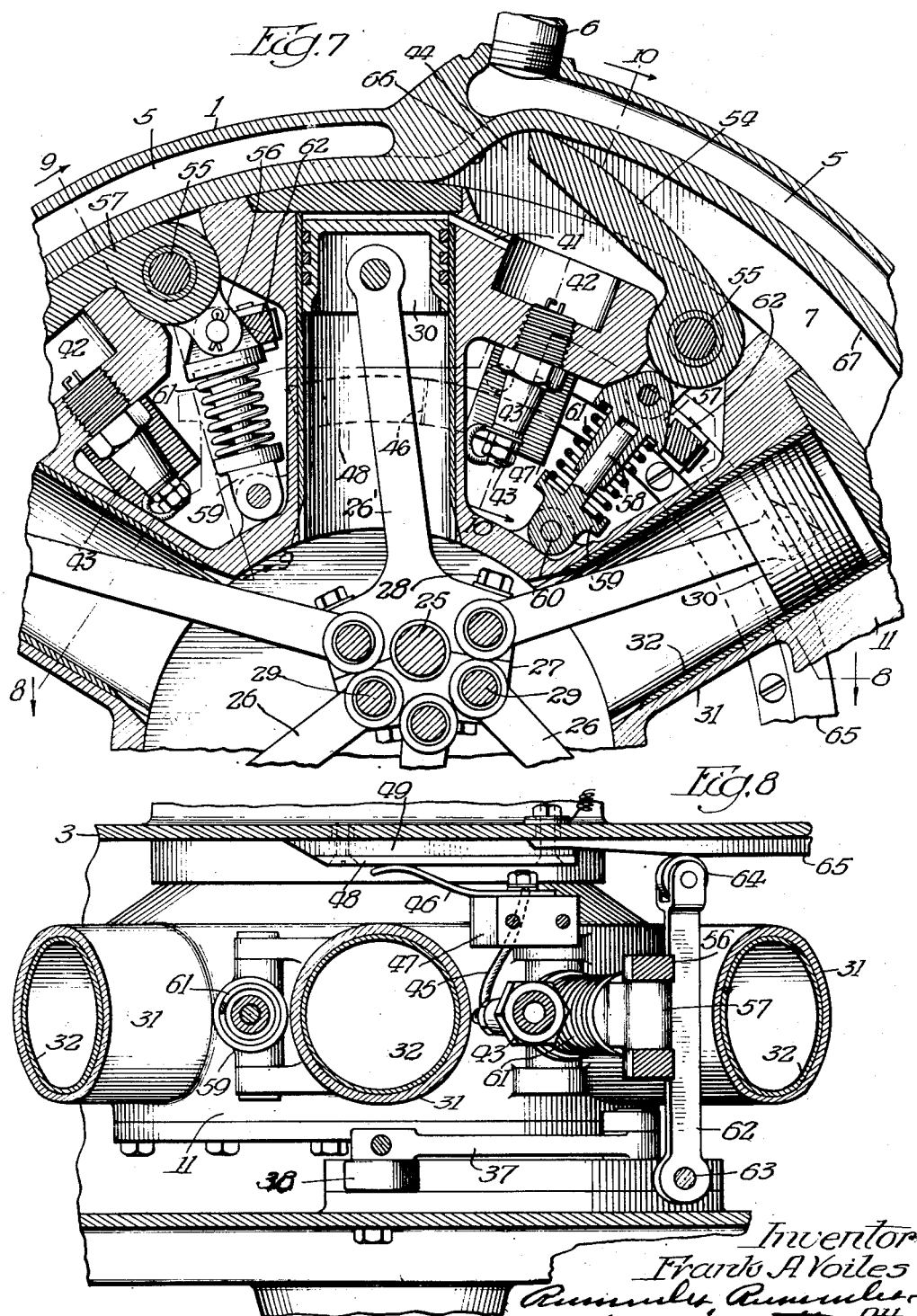

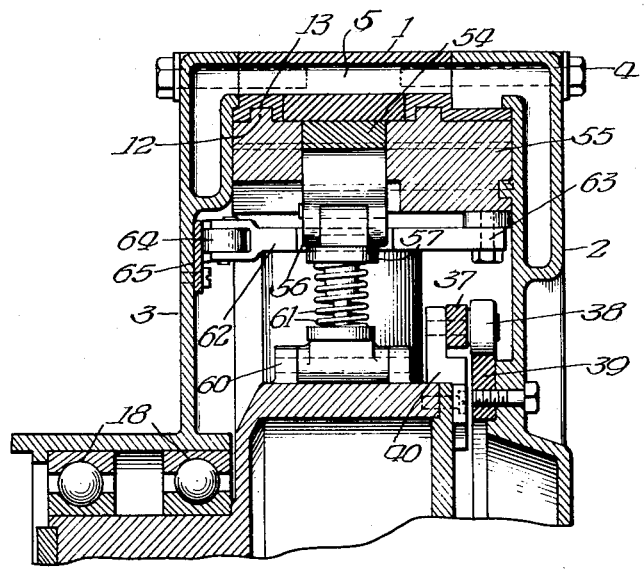

Patented Aug. 16, 1938

2,127,016

UNITED STATES PATENT OFFICE 2,127,016

INTERNAL COMBUSTION ENGINE

Frank A. Voiles, Chicago, Ill.

Application April 21, 1937, Serial No. 138,194

6 Claims. (Cl. 123—17)

The engine here described has rotating radial compression cylinders. The engine is cylindrical in exterior appearance having a fixed housing of that form. Rotating within the housing is a driven radial cylinder unit designed to deliver compressed charges when ignited to a peripheral arcuate combustion and expansion chamber formed in the housing. The driven unit carries impulse receiving elements which project into the combustion chamber.

The purposes in providing the new motor and incidental benefits accruing from the design are; to enable the use of power strokes of considerable length with large and constant leverage on the driven shaft; to save the compression cylinders and pistons from the heat of combustion; to eliminate time losses due to exhaust strokes and to enable as many power impulses per revolution of the driven shaft as there are compression cylinders in the motor; to permit the exploding mixture to have full useful expansion and to exhaust at nearly atmospheric pressure; to eliminate the requirement for exhaust valves and to free intake valves from the heat of or chemical action of the exploding mixture; to eliminate some of the structural weaknesses and to improve the mechanical action of the elements of internal combustion engines; to avoid the side thrust of reciprocating pistons on explosion strokes and the variable leverage between the pistons and cranks in transmitting power and to save the connecting rod bearings from the hammering action of explosive impulses transmitted thereto.

The long power strokes, of this motor, down to a low pressure exhaust enable a considerable fuel economy while maintaining a high power delivery with reference to the weight of the engine. In this engine there is no idle exhaust stroke of the impulse receiving elements thereof. With this long stroke principle the fuel may be burned to a point insuring a reduction of the customary monoxide gas production. Also, with this motor backfire hazards are reduced as it cannot backfire. The motor is of such design as not to interfere with stream lining when used on air craft and has few projecting parts likely to produce eddy currents.

Further purposes of the invention are to enable the delivery of equal fuel mixture charges to all the compression cylinders of the motor; and to allow for free exhaust at about atmospheric pressure whereby silencers or mufflers are not required.

Other objects of the invention are to provide a substantially vibrationless, smooth-running gas engine, and to effect a reduction in manufacturing costs because of fewer parts than are usually required in gas engines, and to provide an engine which may be easily started without any possibility of backfiring.

In the drawings illustrating the improved motor:

Fig. 3 is an enlarged longitudinal vertical section parts being shown in elevation as indicated by the line 3—3 on Fig. 1.

Fig. 4 is a transverse vertical section of the motor as indicated by the line 4—4 on Fig. 3.

Fig. 5 is a plan view of the motor showing its fixed casing partly in section and the rotor element of the motor also partly in section.

Fig. 6 is a face view of the rotor, but also show a fixed cam for operating intake valves of the rotor.

Fig. 7 is a fragmentary enlarged vertical section showing in detail the impulse receiving impellers and compression pistons and cylinders.

Fig. 8 is a sectional detail parts being shown in elevation taken on the line 8—8 of Fig. 7.

Fig. 9 is a sectional detail parts being shown in elevation taken on the line 9—9 of Fig. 7, and, Fig. 10 is a sectional detail parts being shown in elevation taken on the line 10—10 of Fig. 7.

Figure 1:
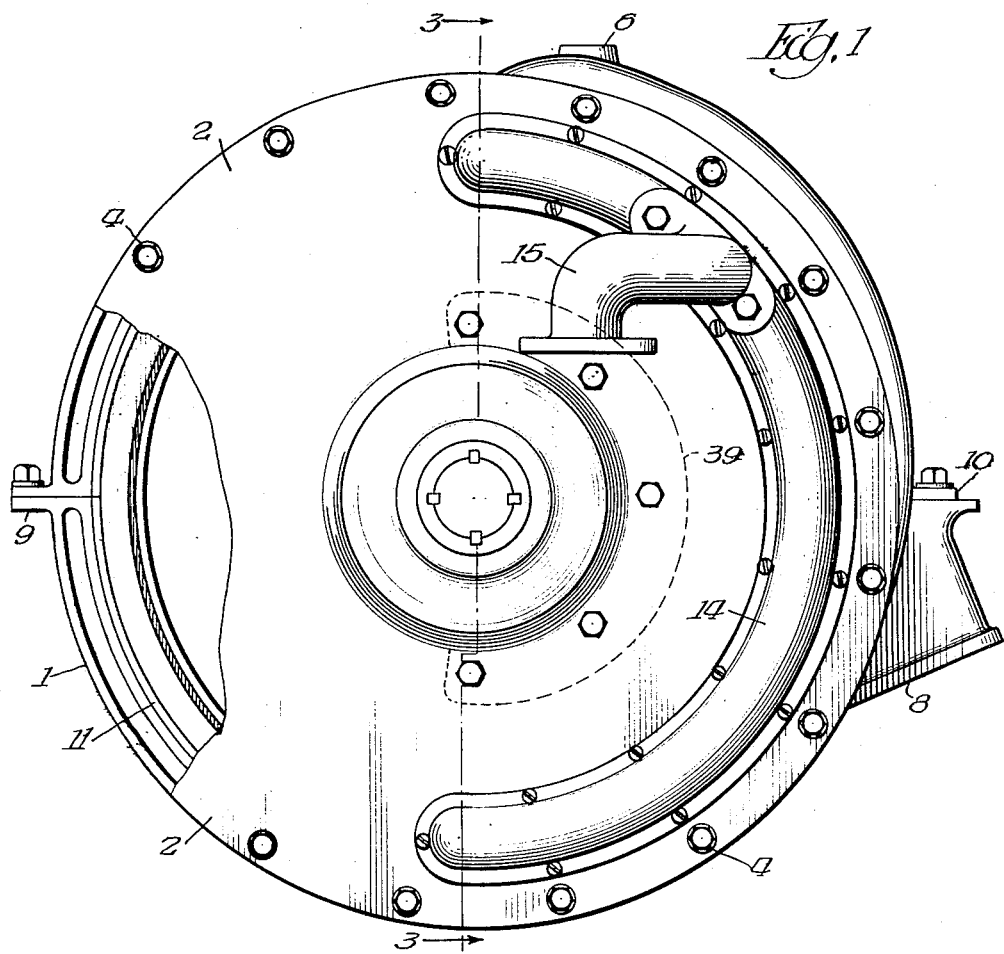
Fig. 1 shows the motor in front elevation with the casing partly broken away.

The principal structural features of this motor are briefly; a fixed housing in the general form of a cylinder comprising a ring-shaped casting with two disk-shaped end-castings bolted thereto; a crank shaft, also fixed; a driven shaft secured to a rotor unit which has bearings on the fixed crank shaft and in one of the end sections of the stator housing; a peripheral combustion and expansion chamber formed in the fixed housing and; impulse receiving elements or vanes carried by the rotor to successively enter the arcuate combustion chamber.

The fixed housing also includes as an element thereof an intake manifold through which the fuel mixture passes on its way to radial compression cylinders of the rotor.

The rotor has a port for each cylinder and these ports successively pass over an arcuate port along the intake manifold. The fuel passageways in the rotor are successively closed, upon the completion of the intake strokes of the compression pistons relative to the compression cylinders with which they revolve eccentrically on the pin portions of the fixed crank shaft.

The pistons have a stroke substantially the full length of the cylinders and force the compressed mixture into charge-receiving pockets in the rotor. These pockets communicate with the combustion chamber at the firing instant when a corresponding rocker or impulse receiving element of the rotor arrives at one end of the combustion chamber.

The general arrangement above outlined is illustrated with all details in the drawings. These drawings show as forming the stator, a central ring-shaped casting element 1 and end castings 2 and 3, Fig. 5. These castings are clamped together by bolts 4. Each casting is cored out to form communicating water circulating spaces as indicated by the numeral 5. The cooling medium enters and leaves the castings through connections at 6 and 6', Fig. 4. The combustion chamber 7 is formed by ring-element 1 and is open at the exhaust end 8. Element 1 is, for convenience in assembly, made in two parts bolted together at the flanges 9 and 10, which arrangement allows the construction to be assembled over the rotor unit 11 which has peripheral tracks 12 fitting internal annular grooves 13 in frame structure 1. An intake manifold 14 is secured to the face of the end casting 2 of the motor frame and carries a flanged elbow 15 to which a carburetor not shown is attached. The intake manifold communicates throughout its length with an arcuate passageway 16 formed in casting 2 and serving to transmit the fuel mixture to receiving ports in the rotor.

The end-casting 3 of the motor housing carries a breather pipe 17. Lubricating oil may be fed to the motor through this pipe in addition to the oil reaching the connecting rod-bearings and cylinder walls by means of passageways in the crank shaft and not shown. The end-casting 3 of the motor housing, as shown in Fig. 3, is formed to enclose bearings 18 for the rotor 11 and the driven shaft 19 secured to the rotor by the bolts 20.

Crank shaft 21 is fixed to the motor housing as may be seen by the keys 22, and the rotor 11 is journaled on the crank shaft through bearings 23 and 24. The part 25 of the crank forms an eccentric support for the piston connecting rods 26. The master rod 26' bears directly on the crank pin 25 being held thereon by the cap member 27 and bolts 28. The remaining connecting rods are pivoted to the base and cap of the master rod as indicated at 29. As customary in radial engines in which the cylinders revolve, the turning of rotor 11 on its axis results in the pistons being carried around with the rotor but having a relative reciprocation due to their eccentric mounting. The pistons 30, as indicated in Figs. 3 and 4 fit the radial cylinders 31 formed in rotor 11 and these cylinders are preferably lined or interiorly surfaced by the sleeves 32 which are of hard wear-resisting material, while the main body of the rotor casting is preferably formed of a light alloy.

Each cylinder 31 communicates at its outer end through a passageway 33, in Fig. 3, in the rotor to an intake port 34 in line with the passageways 16 previously mentioned. These intake ports are controlled by valves 35 which valves are opened against the action of springs 36 by arms 37 in position to bear against the end of the valve stems when rollers 38 thereon are passing over cam 39. This cam is fixed, being secured to end-casting 2 by bolts. The valve operating arms 37 are pivoted to brackets 40, Fig. 6, carried by the rotor.

The valves are seated during the compression stroke at which time the compressed charge is delivered through passageways 41, Figs. 4 and 7, to pockets 42 formed in the rotor casting. Sparkplugs 43 are carried by the rotor and extend into the compressed charge receiving pockets 42 to which sparks are delivered when the pockets successively reach the end 44 of the combustion chamber 7. Each spark plug has a wire connection 45, Fig. 8, with a contact 46 on an insulating block 47, carried by the rotor 11. These contact-elements engage an arcuate conductor 48 carried by an insulator 49 on the motor housing casting 3. The conducting strip 48, Fig. 10, is wired to a distributor not shown.

The shaft 50 is both an accessory-driving and a starter shaft. This shaft is geared to the drive shaft 19 through gears 51.

Figure 2:
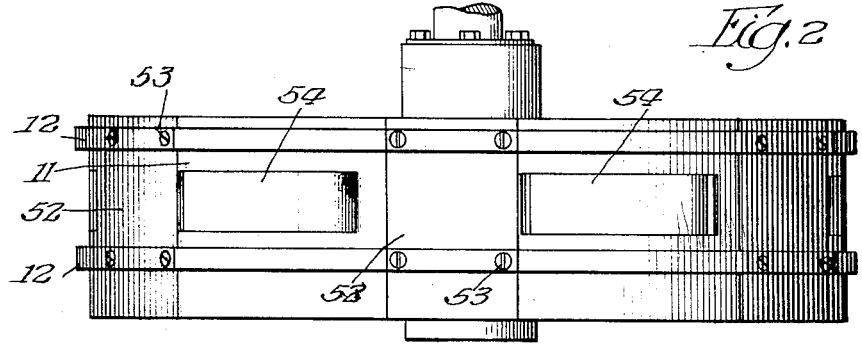
Fig. 2 is a plan view of the rotor.

The rotor is formed to have an outer cylindrical surface. The cylinder-heads 52, Fig. 2, form a continuation of the cylindrical surface and are secured to the rotor by countersunk screws 53. The vanes 54, likewise, have an outer curvature conforming to the cylindrical surface of the rotor.

Explosive impulses are transmitted to the rotor through vanes 54. The latter are pivotally mounted in the rotor on shafts 55 carried by the rotor and are in the form of bell-crank shaped rocker-arms. The inwardly extending parts 56 of the rocker arms pivotally support a spring holder 57 fitting over the shank 58, Fig. 7, of a spring supporting element 59. The elements 59 are pivoted by pins 60 to ears on the rotor casting. These supports 57 and 59 for the spring 61 slidingly engage each other and form a toggle with the impulse receiving rockers 54. The springs normally serve to hold the vanes 54 in their inner position as shown in Fig. 4, as they are then on one side of the dead center position. Motion of the impulse-receiving rockers into the combustion and expansion chamber 7 is mechanically accomplished by means of the transverse levers 62, Figs. 8 and 9, which bear against the spring support 57 and are pivoted to the rotor at 63. At its opposite end each lever 62 carries a roller 64 for bearing on an arcuate cam 65, Fig. 8, secured to the end housing element 3.

In action the vanes 54 follow along the inner surface of the cylindrical housing element 1, and move outwardly and follow the form of the combustion chamber 7, because the cam 65 is engaged by lever 62 and also due to the pressure of the compressed mixture in the pockets 42 and the centrifugal force on vanes 54. These impellers thus follow the curved surface 66, Fig. 7, at the end 44 of the combustion chamber. When the vanes arrive at this point ignition takes place and the explosion serves to hold the vanes against the surface 67 of the combustion chamber, with which the vanes are designed to fit for an oil seal. Surface 67 is eccentric to the rotor center and serves to push the vane back past the dead center position of the vane toggle. When the useful force of the explosion is spent, the toggle spring 61 returns the vane to its seat.

The performance of this motor is notable for its fuel economy, capacity for delivery of the fuel mixture at almost any desired pressure, even Diesel requirements in that regard, time factor for effecting complete combustion through the long stroke, and delivery of the exhaust gases without flame and noise at substantially atmospheric pressure. The engine has been described in connection with a sparking ignition system, but of course, it is suitable for other methods of ignition. Other favorable characteristics of the motor are that the intake valves are not subject to the heat of combustion or the direct action of the burning gases and that no movable exhaust port controlling valves are required as the vanes 54 have the double function of receiving explosive impulses and opening the combustion chamber wide open to the atmosphere at the end of the stroke.

The impulse receiving and driving unit as a whole has a continuous, rotary motion and this frees the engine of vibration difficulties resulting from heavy reciprocating or oscillating parts.

In the operation of the engine with the arrangement as illustrated, it is started by rotating shaft 50 with any of the customary starting means. Rotation of this shaft is transmitted to the rotor unit 11 through shaft 19 which is rigid with the rotor. As the rotor turns the pistons 30 rotate with it, through engagement with the respective cylinders, but around the eccentric portion 25 of crank shaft 21. The crank shaft is held stationary with the fixed motor housing comprising parts 1, 2, and 3, which carries the bearings 18 for driven shaft 19 and is keyed to the crank shaft as indicated at 22, Fig. 3. The crank shaft, in turn, supports bearings 23 for the rotor. The opposite end of the crank shaft is held centered by bearings 24 between it and the rotor. The latter therefore turns upon bearings 23 and 24 and with the driven shaft 19 within the bearings 18.

The eccentric rotation of pistons 30 causes them to reciprocate relatively to the cylinders. Upon the down stroke of the pistons the fuel mixture is drawn into the cylinders and upon the up stroke of the pistons the mixture is compressed into the firing pockets 42. A carburetor, not shown, is attached to the hollow supporting elbow 15 communicating with the intake manifold 14, Fig. 1. During the down stroke of a piston, its corresponding intake valve 35, Fig. 3, is held open due to engagement of a roller 38 with cam 39. The roller carrying arm 37 is held in its outer position during the intake stroke and by engagement with the stem of valve 35 holds the valve open against the action of valve closing spring 36.

At the end of the intake stroke roller 38 runs off the cam and the spring then closes the valve. During approximately the next 180° movement of the rotor unit, the mixture is compressed and forced through passageway 41, Fig. 7, into one of the ignition pockets 42. This pocket is capped by a vane 54 which at the instant of maximum compression arrives at the reversed curved end 66 of the combustion chamber and moves outwardly along that surface during the initial stage of combustion. Ignition takes place at the beginning of the outward motion of vane 54 but time is required for complete combustion and this takes place during the angular stroke of the vane with the rotor.

The ignition circuit is not shown as this follows the customary practice and includes the use of a distributor operated by accessory shaft 50, Fig. 3. The circuit is completed to the spark plugs and only at exactly the right time through the wiper contacts 46. The stationary contact strip 48 is short so that it is impossible by any incorrect adjustment of the distributor or breaker points to cause a firing in advance of the compressed charge reaching the point where this exploding charge enters the combustion chamber.

The vanes 54, Fig. 7, are normally held down so that their outer curved surfaces conform to the outer cylindrical surface of the rotor. This is done by springs 61, but when the vanes arrive at the combustion and expansion chamber the stationary cam 65, Fig. 8, acting upon the actuating arm 62, holds the vane out as shown in Fig. 7 until it arrives near the point of exhaust 8, Figs. 1 and 4.

The drawings serve to illustrate the general design of the motor and its principle of operation, but exact proportions are not maintained in the drawings due to the limited dimensions of the sheets. Details are exaggerated beyond proportions most convenient for assembly.

The vanes 54 form a toggle with the spring 61, and cam surfaces on the stator, as previously described, serve to rock the vanes inwardly and outwardly on their pivots, which action is sufficient to cause the spring 61 to rock on its pivot and become effective for either causing the vanes 54 to seal the compression chambers 42 with a definite predetermined pressure or to cause the vanes to engage and follow the outer surface of the combustion and expansion chamber 7. With this method of sealing the compressed charge-receiving and ignition chambers 42, no hot sliding surfaces are depended upon for holding compression. That characteristic is a most vital and essential thing for successful performance of this type of motor.

I claim:

1. An internal combustion engine having a rotor formed with a series of radial compression cylinders and eccentrically mounted pistons fitting said cylinders, a stator surrounding said rotor and having an arcuate combustion and expansion chamber formed therein, impulse-receiving vanes movably carried by said rotor for movement into and out of said combustion chamber, charge-receiving pockets in said rotor for receiving compressed fuel charges under the action of said pistons, said vanes forming a seal for said pockets except when in said combustion chamber, and means located in said pockets for firing charges at the instants when said vanes enter the combustion chamber.

2. An internal combustion engine having a rotor formed with a series of radial compression cylinders and eccentrically mounted pistons fitting said cylinders, a stator surrounding said rotor and having an arcuate combustion chamber formed therein, vanes movably carried by said rotor for movement into and out of said combustion chamber, charge-receiving pockets in said rotor for receiving compressed fuel charges under the action of said pistons, said vanes forming a seal for said pockets except when in said combustion chamber, means for firing charges in said pockets at the instants when said vanes enter the combustion chamber, and mechanical means for moving said vanes into and out of said combustion chamber.

3. An internal combustion engine comprising a fixed cylindrical casing having an arcuate peripheral-combustion and expansion chamber, a rotor journaled in said casing concentric therewith, said rotor comprising a plurality of radial cylinders and including formed therein a series of charge-receiving pockets, vanes pivotally mounted on said rotor in position normally to seal said charge-receiving pockets and made to conform to the outer surface of said rotor and also to fit the walls of the combustion chamber, and means for causing said vanes to rock on their pivots outwardly into the combustion chamber whereby communication is successively made between the charge-receiving pockets and the combustion chamber, means for firing charges in the charge-receiving pockets at the instants when the vanes start to move into the combustion chamber, compression pistons fitting said cylinders to rotate therewith, a fixed support for said pistons located eccentric to the axis of said rotor whereby the pistons are caused to reciprocate in the cylinders upon rotation of the rotor, said housing being provided with an intake manifold, and poppet valve mechanism on the rotor for affording communication between the cylinders and intake manifold prior to the compression strokes of the pistons.

4. An internal combustion engine having a fixed cylindrical stator with an arcuate combustion and expansion chamber formed therein, a rotor mounted within and concentric with said stator, and comprising a series of radial cylinders and pistons, an eccentric pivot support for said pistons, a series of vanes pivotally mounted on said rotor, means for causing said vanes to swing as necessary to follow the form of said combustion chamber, said means including toggle mechanisms and springs for forcing said vanes outwardly or inwardly as the toggles pass center positions, and cam mechanism for rocking said toggles past center positions.

5. A gas engine of the class described comprising a stator of cylindrical form and including an arcuate combustion chamber, said stator being provided with an arcuate intake manifold, a rotor including radial cylinders concentric with the stator, pistons for the cylinders supported eccentric to said cylinders, means including passageways formed in the stator for causing communication between the outer ends of said cylinders and the intake manifold on the stator, valve mechanisms for controlling said passageways, a cam carried by the stator for operating said valve mechanisms, charge-receiving pockets formed in the rotor and in communication with said cylinders, vanes mounted on said rotor and formed to seal compressed charges in said pockets, spring-actuated toggle mechanisms for holding said vanes in sealing position and for engaging said vanes with the walls of said combustion chamber, means for actuating said spring-toggle mechanism to cause the toggle mechanisms to pass center position, and means for firing compressed charges at the start of movement of said vanes into said combustion chamber.

6. A gas engine of the class described comprising a stator of cylindrical form and including an arcuate combustion chamber, said stator being provided with an arcuate intake manifold, a rotor including radial cylinders concentric with the stator, pistons for the cylinders supported eccentric to said cylinders, means including passageways formed in the stator for causing communication between the outer ends of said cylinders and the intake manifold on the stator, valve mechanisms for controlling said passageways, a cam carried by the stator for operating said valve mechanisms, charge-receiving pockets formed in the rotor and in communication with said cylinders, vanes mounted on said rotor and formed to seal compressed charges in said pockets, spring-actuated toggle mechanisms for holding said vanes in sealing position, means for actuating said spring-toggle mechanism to cause the toggle mechanisms to pass center position, and means for firing compressed charges at the start of movement of said vanes into said combustion chamber.

FRANK A. VOILES.